US012135666B2

(12) United States Patent
Mehrvar (10) Patent No.: US 12,135,666 B2
(45) Date of Patent: Nov. 5, 2024

(54) METHOD AND COMPUTING UNIT FOR TRANSMITTING DATA OVER A COMMUNICATION NETWORK

(71) Applicant: HUAWEI TECHNOLOGIES CO., LTD., Guangdong (CN)

(72) Inventor: Hamid Mehrvar, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 50 days.

(21) Appl. No.: 18/150,867

(22) Filed: Jan. 6, 2023

(65) Prior Publication Data

US 2024/0232113 A1 Jul. 11, 2024

(51) Int. Cl.
*G06F 13/40* (2006.01)
*G06F 13/38* (2006.01)

(52) U.S. Cl.
CPC ........ *G06F 13/4022* (2013.01); *G06F 13/385* (2013.01)

(58) Field of Classification Search
None
See application file for complete search history.

(56) References Cited

U.S. PATENT DOCUMENTS

| | | | | |
|---|---|---|---|---|
| 11,354,936 | B1 * | 6/2022 | Chandarana | G06V 40/172 |
| 11,537,139 | B2 * | 12/2022 | Rankawat | G06F 18/24143 |
| 2019/0138470 | A1 * | 5/2019 | Li | G06F 13/14 |
| 2020/0042264 | A1 * | 2/2020 | Zheng | G09G 5/005 |
| 2021/0103544 | A1 * | 4/2021 | Guim Bernat | G06F 13/4068 |
| 2021/0109881 | A1 * | 4/2021 | Moustafa | B60W 60/001 |
| 2022/0086100 | A1 * | 3/2022 | Biederman | H04L 47/56 |
| 2022/0108421 | A1 * | 4/2022 | Shacklett | G06T 3/4046 |
| 2022/0206770 | A1 * | 6/2022 | Facory | G06F 8/451 |
| 2023/0060131 | A1 * | 3/2023 | Wang | G06N 3/045 |
| 2023/0153421 | A1 * | 5/2023 | Givental | G06N 5/01 726/23 |
| 2024/0007414 | A1 * | 1/2024 | Jain | G06F 9/505 |

* cited by examiner

*Primary Examiner* — Henry Tsai
*Assistant Examiner* — Aurangzeb Hassan
(74) *Attorney, Agent, or Firm* — BCF LLP (57) ABSTRACT

A method of transmitting a data packet from a first data processing device toward a second data processing device, the first and second data processing devices being communicably connectable to one another via respective first and second interface devices and over an optical network includes determining a communication path in the optical network to communicably connect the first data processing device to the second data processing device, accessing, by a coordination module communicably connected to the first interface device, a pre-determined training sequence, transmitting, by the coordination module and over the communication path, the pre-determined training sequence to cause the second interface device to recover a signal clock from the pre-determined training sequence and transmitting, by the first data processing device, the data packet toward the second processing device over the communication path. A coordination module implements the method in a computing unit.

18 Claims, 8 Drawing Sheets

METHOD AND COMPUTING UNIT FOR TRANSMITTING DATA OVER A COMMUNICATION NETWORK

FIELD OF THE TECHNOLOGY

The present technology relates to network communications. In particular, a method and a computing unit used for transmitting a data packet from a first data processing device toward a second data processing device are disclosed.

BACKGROUND

Recent developments in computing have led to increase of the demand for fast processing of large scale data. High performance computing (HPC) that may involve Artificial Intelligence (AI) processes usually relies on clusters of computers and data storages interconnected by high-speed switches. The main metric that is typically used to assess performances of HPC environment is latency. A relatively low latency leads to increased performances. Latency may be measured when a single program, application or algorithm is being executed, also referred to as a "no-load" situation, or when a plurality of programs, applications or algorithms are executed in parallel, also referred to as a "at-load" situation. Whether a system is loaded or not-loaded, switching latency is considered to be one of the bottlenecks for computational performance improvement. As an example, a large typical HPC system including 1024 General Processing Unit (GPU) may be used in order to perform natural language training. This requires a massive amount of communication between the GPUs. In this scenario, it has been determined that the ratio of communication time to total time required to complete the task on average is about 57%. Depending on the task, the communication time is 20% to 80% of the total execution time.

Therefore, there is a desire for a computing unit that can reduce the communication time between data processing devices such as GPUs relatively to calculation time.

SUMMARY

In a first broad aspect of the present technology, there is provided a method of transmitting a data packet from a first data processing device toward a second data processing device, the first and second data processing devices being communicably connectable to one another via respective first and second interface devices and over an optical network. The method comprises determining a communication path in the optical network to communicably connect the first data processing device to the second data processing device, accessing, by a coordination module communicably connected to the first interface device, a pre-determined training sequence, transmitting, by the coordination module and over the communication path, the pre-determined training sequence to cause the second interface device to recover a signal clock from the pre-determined training sequence and, after transmitting of the pre-determined training sequence, transmitting, by the first data processing device, the data packet toward the second processing device over the communication path.

In some implementations, the training sequence comprises a periodic sequence of bits.

In some implementations, the first data processing device is a first graphic processing unit (GPU).

In some implementations, the second data processing device is a second GPU.

In some implementations, the first data processing device is a first GPU of a first server, and the second data processing device is a second GPU of a second server.

In some implementations, the coordination module is a field-programmable gate array (FPGA) communicably connected to the first data processing device.

In some implementations, the coordination module is a central processing unit (CPU) communicably connected to the first data processing device.

In some implementations, the communication path is a first communication path and the data packet is a first data packet, and the method further includes, concurrently with transmitting, by the coordination module and over the first communication path, the pre-determined training sequence, transmitting, from the first data processing device to a third data processing device, a second data packet over a second communication path, via a third interface device associated with the first data processing device and a fourth interface device associated with the third data processing device.

In some implementations, the method further includes transmitting the data packet once a pre-determined time delay has elapsed after transmitting the pre-determined training sequence.

In some implementations, the pre-determined time delay is between 50 and 150 ns.

In a first broad aspect of the present technology, there is provided a computing unit, including a first data processing device communicably connectable to a second data processing device of a peer computing unit via respective first and second interface devices and over an optical network and a coordination module. The coordination module receives, from an orchestrating module communicably connected to the coordination module, information about a communication path of the optical network, causes the first interface device to connect the first data processing to a first end of the communication path to communicably connect the first data processing device to the second data processing device, the second interface device being connected to a second end of the communication path, transmits a pre-determined training sequence to the second interface device over the communication path, a reception of the pre-determined training sequence by the second interface device causing the second interface device to perform a clock data recovery routine to recover a signal clock from the pre-determined training sequence and causing the first data processing device to transmit a data packet to the second data processing device over the communication path.

In some implementations, the training sequence comprises a periodic sequence of bits.

In some implementations, the first data processing device is a first GPU.

In some implementations, the second data processing device is a second GPU.

In some implementations, the first data processing device is a first GPU of a first server, and the second data processing device is a second GPU of a second server.

In some implementations, the coordination module is a FPGA communicably connected to the first data processing device.

In some implementations, the coordination module is a CPU communicably connected to the first data processing device.

In some implementations, the communication path is a first communication path and the data packet is a first data packet, the orchestrating module further causing, concurrently with causing transmission, by the coordination module and over the first communication path, of the pre-determined training sequence, the first data processing device to transmit a second data packet over a second communication path to a third data processing device communicably connected thereto, via a second interface device associated with the first data processing device and a fourth interface device associated with the third data processing device.

In some implementations, the orchestrating module further causes the first data processing device to transmit the data packet once a pre-determined time delay has elapsed after the transmission of the pre-determined training sequence from the coordination module to the second data processing device is over.

In some implementations, the pre-determined time delay is between 50 and 150 ns

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagram herein represents conceptual views of illustrative circuitry embodying the principles of the present technology. Similarly, it will be appreciated that any flowcharts, flow diagrams, state transition diagrams, pseudocode, and the like represent various processes that may be substantially represented in non-transitory computer-readable media and so executed by a computer or processor, whether or not such computer or processor is explicitly shown.

The functions of the various elements shown in the figures, including any functional block labeled as a "processor" or "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some implementations of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, the expression "data" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

With these fundamentals in place, we will now consider some non-limiting examples to illustrate various implementations of aspects of the present technology.

Figure 1:
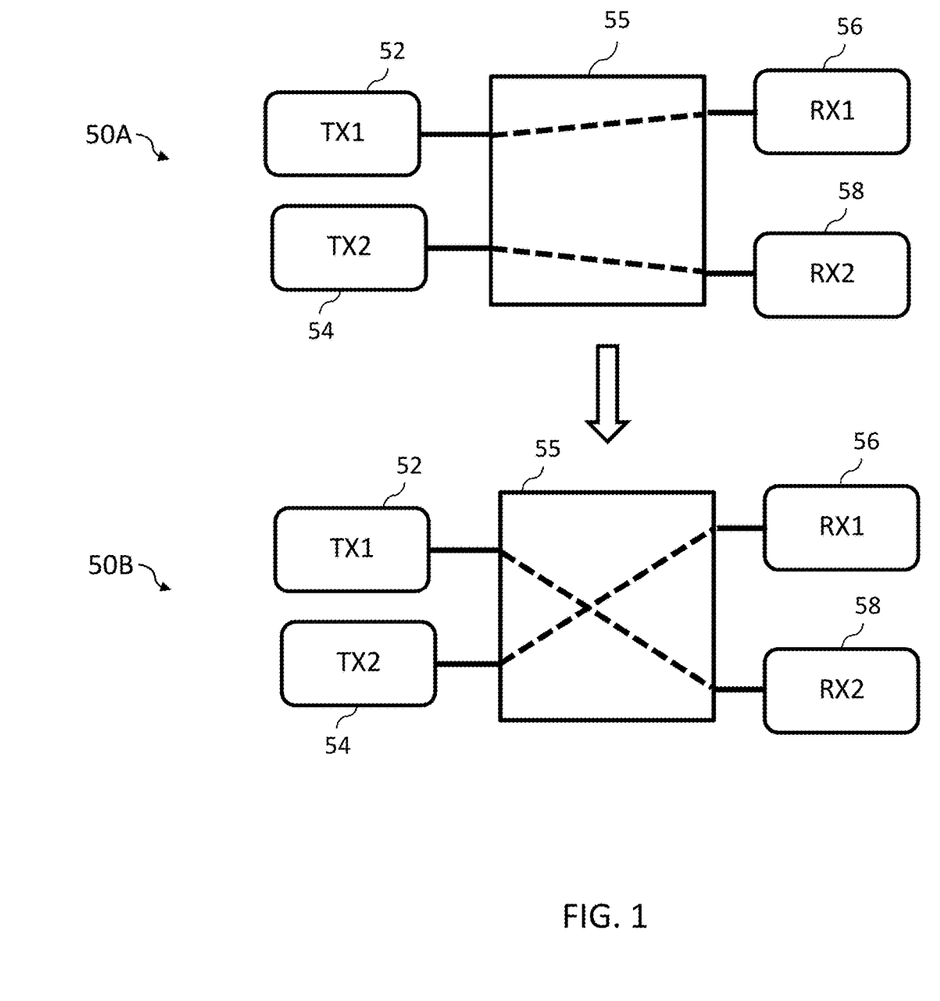
FIG. 1 is schematic representations of two configurations of an optical switch.

Referring to FIG. 1, there are shown schematic representations of two configurations 50A, 50B of an optical switch 55. Developers of the present technology have realized that using optical switching may help in reducing a switching time, which is part of the communication time between data processing devices, due to the absence of optical to electrical conversion of the signal transmitted between data processing devices.

In the first configuration 50A of the optical switch 55, a first data transmitting device 52 is communicably connected with a first data receiving device 56, and a second data transmitting device 54 is communicably connected with a second data receiving device 58. As such, an optical signal may be transmitted from the first data transmitting device 52 to the first data receiving device 56. In a similar manner, an optical signal may be transmitted from the second data transmitting device 54 to the second data receiving device 58. The optical switch 55 may modify its structure (e.g. internal optical communication paths thereof) to reach the second configuration 50B. In the second configuration 50B, the first data transmitting device 52 is communicably connected with the second data receiving device 58, and the second data transmitting device 54 is communicably connected with a first data receiving device 56. The first and second configurations may be referred to as "switching states" of the optical switch 55.

In the context of the present specification, a plurality of optical switches, such as optical switch 55, implemented in parallel and/or in series, may be referred to as an optical network. Each optical switch of the optical network may be referred to as an "optical plane" of the optical network. For example, an N×N switch, where $N=2^i$ where i is an integer equal to or above 2, may use a plurality of columns of 2×2 switches. The architecture varies (e.g. Banayan or Benes) due to number of columns (or a number of stages of switches in series) and total number of 2×2 switches that are used to implement a multi-stage N×N. As a result, a light-path connection from an input to an output may rely on a set-up of a plurality of optical switches (one in each stage) implemented in parallel and/or in series.

Broadly speaking, an optical network may be implemented in different manners. For instance, an optical network may be static cross-connect optical switches that are configured to interconnect the data processing devices with less frequent connectivity changes. Connectivity between data processing devices may be performed using known fast photonic switches with typical switching speed of nanoseconds. An optical network may also be implemented using static switches at a core thereof to provide increased flexibility of connections. Each data processing device may use fast photonic switches to select which of communication paths of the optical network to use in order to connect to a target data processing device.

More specifically, the data processing devices may use these photonic switches to communicate to other data processing devices. They do so by communicating to other devices that drive/control the photonic switches. For instance and without limitations, FPGA or another control circuitry may configure the photonic switches in time before completion of a task to allow switch establishment, sending training sequence to lock the receiver of their side, and setting the communication link up and ready for the next communication of this data processing device with another one, as it will be described in greater details herein after.

It should be noted that, even though optical switching offers speed and energy efficiency due to elimination of optical to electrical conversion, optical switching relies on discontinuations of the optical signals as the switching state changes. Although the dis-continuity time is relatively short (e.g. a few nanoseconds), the discontinuity may cause an internal clock of the data receiving device to be out of lock as it does not receive optical signals during the switching time.

For proper reception of data, the clock of a data receiving device is expected to be locked both in frequency and phase to the signal received from a data transmitting device in order to be able to extract data from the received optical signal. In other words, the data receiving device expects to receive some information (e.g. a series of bits) from which it can extract the clock phase and frequency. As a result, the data receiving device may lock to the data transmitting device during a locking time during which the internal clock of the data receiving device locks to the clock phase and frequency. Data packets transmitted by the data transmitting device during the locking time may thus be lost, causing a "packet loss" while the internal clock of the data receiving device is not locked yet.

In an aspect, the present technology provides a computing unit that prevents packet losses from happening while reducing a communication time compared with standard communication processes.

Figure 2:
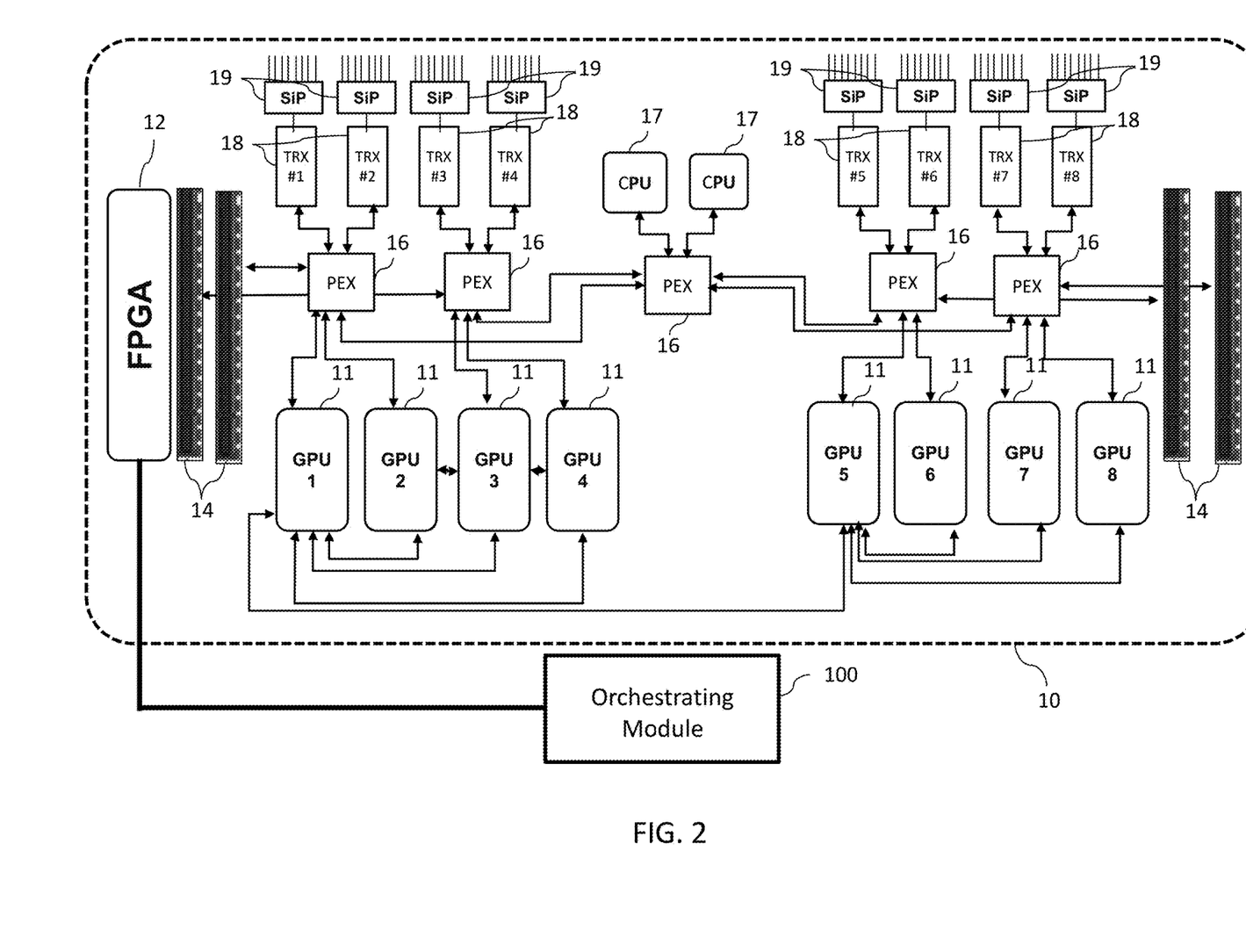
FIG. 2 is a block-diagram of a computing unit in accordance with an implementation of the present technology.

FIG. 2 is a block-diagram of a computing unit 10 in accordance with an implementation of the present technology. In an implementation, the computing unit 10 is a server including eight data processing devices 11. In the illustrative example of FIG. 2, the data processing devices 11 are graphics processing units (GPU) numbered 1 to 8. The data processing devices 11 are communicably connected to interface devices 18, or "transceivers 18", through Peripheral Component Interconnect (PCI) Express switches 16, or simply "PEX" 16. The computing unit 10 may further include central processing units (CPU) 17 (two of which are depicted on FIG. 2). Functions of the interface devices 18 include electrical-to-optical conversion and optical-to-electrical conversion.

In this implementation, each data processing device 11 is communicably connected to a first interface device 18 and a second interface device 18. In, use, the first interface device 18 of a given data processing device 11 may be used to communicate data packets to another data processing device 11 at a first moment in time, and the second interface device 18 of the given data processing device 11 may be used for transmitting training sequence for an upcoming connection with yet another data processing device 11 as well as communication of data packets once transmission of the training sequence has ended.

The computing unit 10 may further include one or more PCI slots 14 that may host field-programmable gate array (FPGA) boards 12 to provide additional computation resources and computing coordination resources as will be described in greater details herein after. In use, the FPGA boards 12 may communicate with the data processing devices 11 (and/or other processors, e.g., CPU) through the PEX 16. In the context of the present disclosure, the FPGA may thus be referred to as a "coordination module" 12 of the computing unit 10. It is contemplated that the CPUs 17 may perform the functions of coordination module 12 recited herein in alternative implementations.

Figure 3:
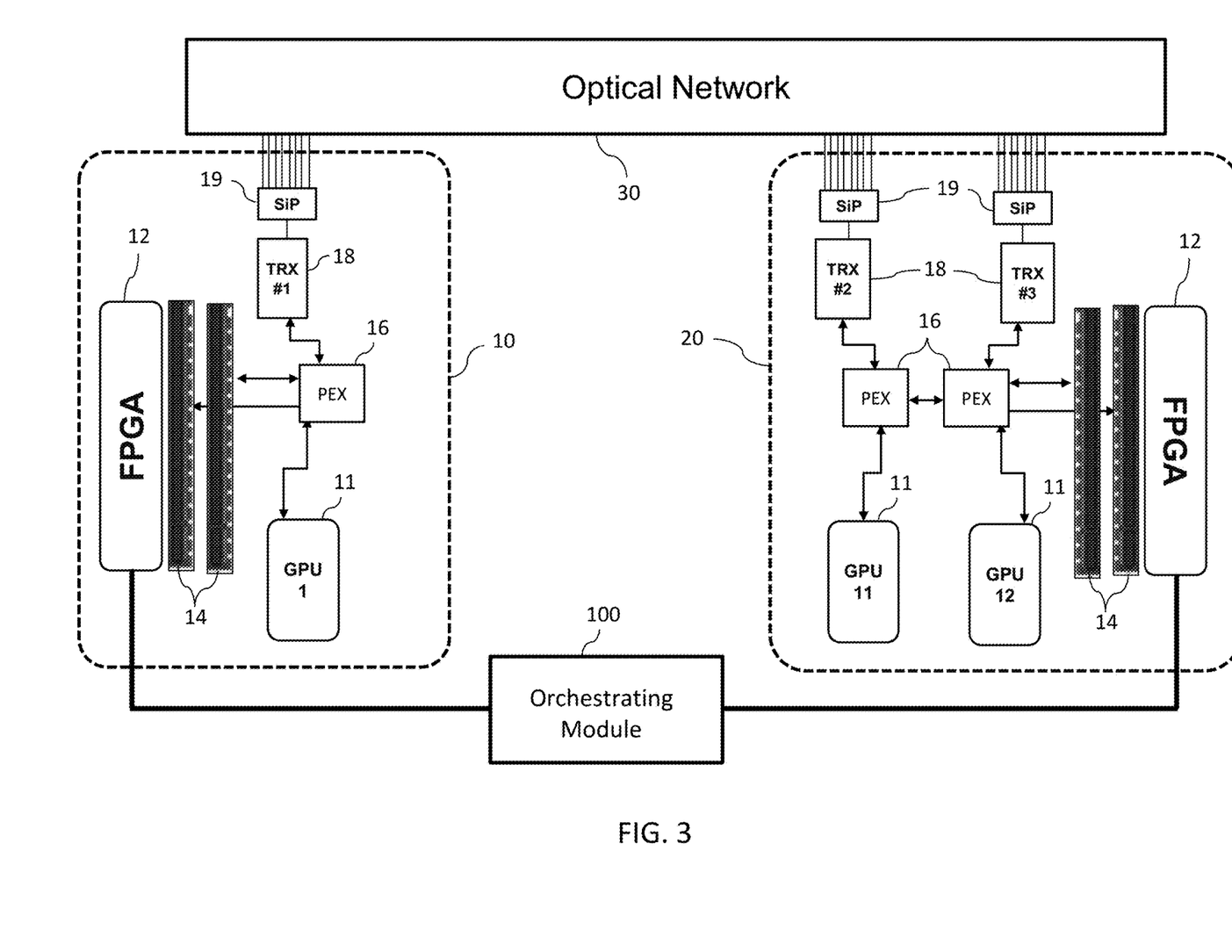
FIG. 3 is a block-diagram of a computing unit communicably connected to a peer computing unit in accordance with another implementation of the present technology.

The computing unit 10 further includes interface devices 18 connected to corresponding photonic switches 19 to allow dynamic connectivity between the data processing devices 11 and an optical network (FIG. 3). More specifically, the photonic switches 19 have a 1×N structure such that the data processing devices 11 may be connected to N planes of the optical network, where $N=2^i$, i being a natural number. In an implementation, the photonic switches 19 are embodied as 1×8 to connect to 8 planes of switches. This 1×8 photonic switch has three stages and seven switches of 1×2. More specifically, a first stage includes one switch 1×2 whose two outputs are connected to inputs of two other 1×2 photonic switches in a second stage. The four outputs of the second stage connect to inputs of four other 1×2 photonic switches in a third stage, providing a total of 8 outputs. This 1×8 switch uses a total of 7 photonic switches of 1×2

As such, a given data processing device 11 may in use, communicate with another data processing device 11 of the same computing unit 10 through the PEX 16, and/or communicate with another data processing device 11 of another computing unit through a given interface device 18, the corresponding photonic switch 19, and the optical network, the optical network providing optical communication between the computing unit 10 and other computing units.

In an implementation, the computing unit 10 is communicably connected to an orchestrating module 100. The orchestrating module 100 may in response to determining that a first data processing device 11 of a first computing unit should communicate with a second data processing device 11 of a second computing unit, use a connection table to determine which of the N planes of the optical network should be used to establish the communication between the first and second data processing devices 11. The orchestrating module 100 may further cause coordination modules 12 of both of the first and second computing units to set up a corresponding photonic switch 19 to provide connectivity between the first and second data processing devices 11. The connection table may be stored in a memory of the orchestrating module 100 or be communicably connected thereto.

FIG. 3 illustrates communication between a first data processing device 11 ("GPU #1") of the computing unit 10 with a second data processing device 11 ("GPU #11") of another computing unit 20 over an optical network 30. In the illustrative implementation of FIGS. 3 to 6, the second data processing device 11 (GPU #11) and a third data processing device 11 (GPU #12) are implemented in the same computing unit 20. The second and third data processing devices 11 may be implemented in different computing units in alternative implementations of the present technology.

Figure 4:
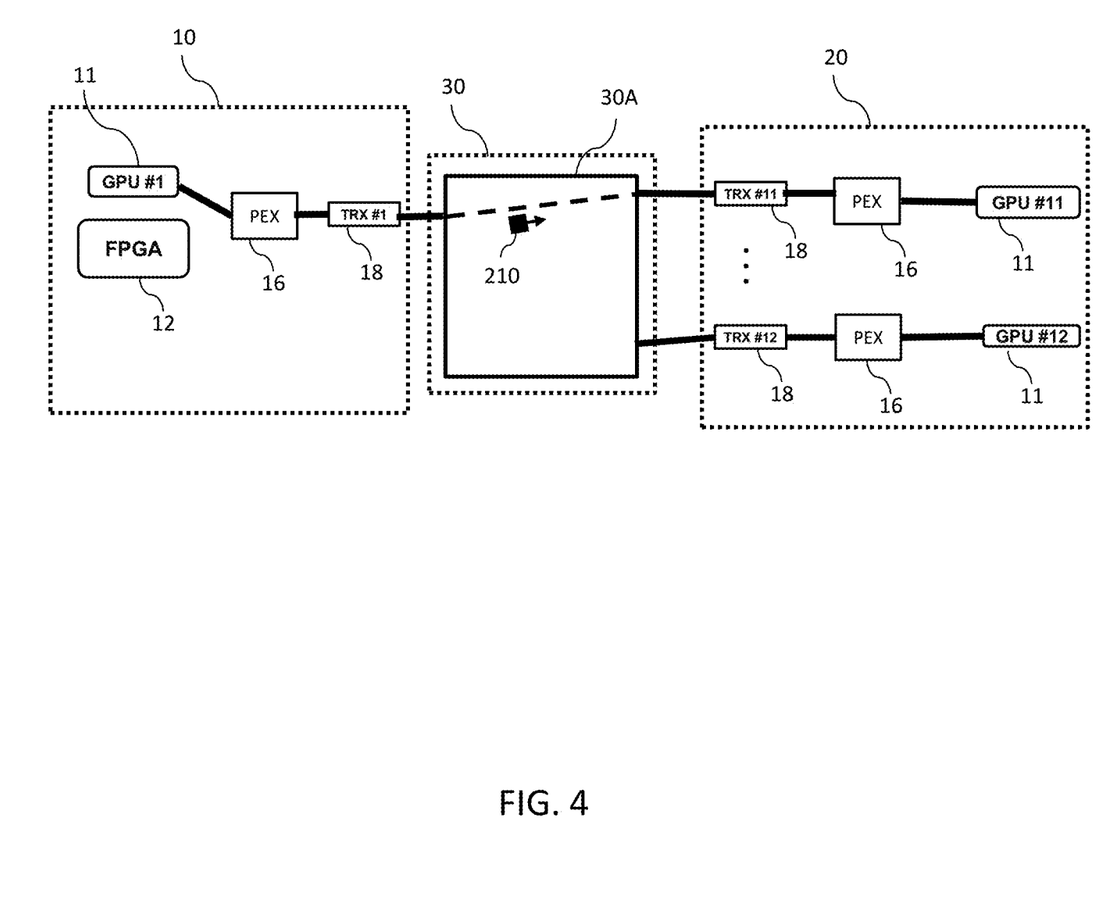
FIG. 4 is a block-diagram of the computing unit of FIG. 3 communicating in a first configuration with the peer computing unit in accordance with yet another implementation of the present technology.

At a first moment in time and with concurrent reference to FIG. 4, GPU #1 is communicably connected to the second data processing device 11 (GPU #11) over a first plane 30A of the optical network 30, as shown on FIG. 4. As an example, it is assumed that the first data processing device 11 is communicably connected to the second data processing device 11 ("GPU #11") at a first moment in time. For example, a data packet 210 may be transmitted from the GPU #1 to GPU #11. Photonic switches 19 are not shown on FIGS. 4 to 6 for clarity purposes.

In response to receiving request that a new connection is to be established between the first data processing device 11 (GPU #1) and the third data processing device 11 (GPU #12), the orchestrating module 100 determines on which optical plane of the optical network 30 the new connection will be established. To do so, the orchestrating module 100 may use a look-up table or use any known techniques to select an optical plane to establish the connection. The orchestrating module 100 may cause coordination modules 12 of the computing units 10, 20 to send control signals to configure their photonic switches 19 corresponding to the first and third data processing devices 11 (GPU #1 and GPU #12) in order to ensure proper connection over the selected optical plane. In other words, the orchestrating module 100 causes the coordination modules 12 to adjust a switch connection between GPU #1 and GPU #12, and thus establish a communication path over the optical plane 30B.

Figure 5:
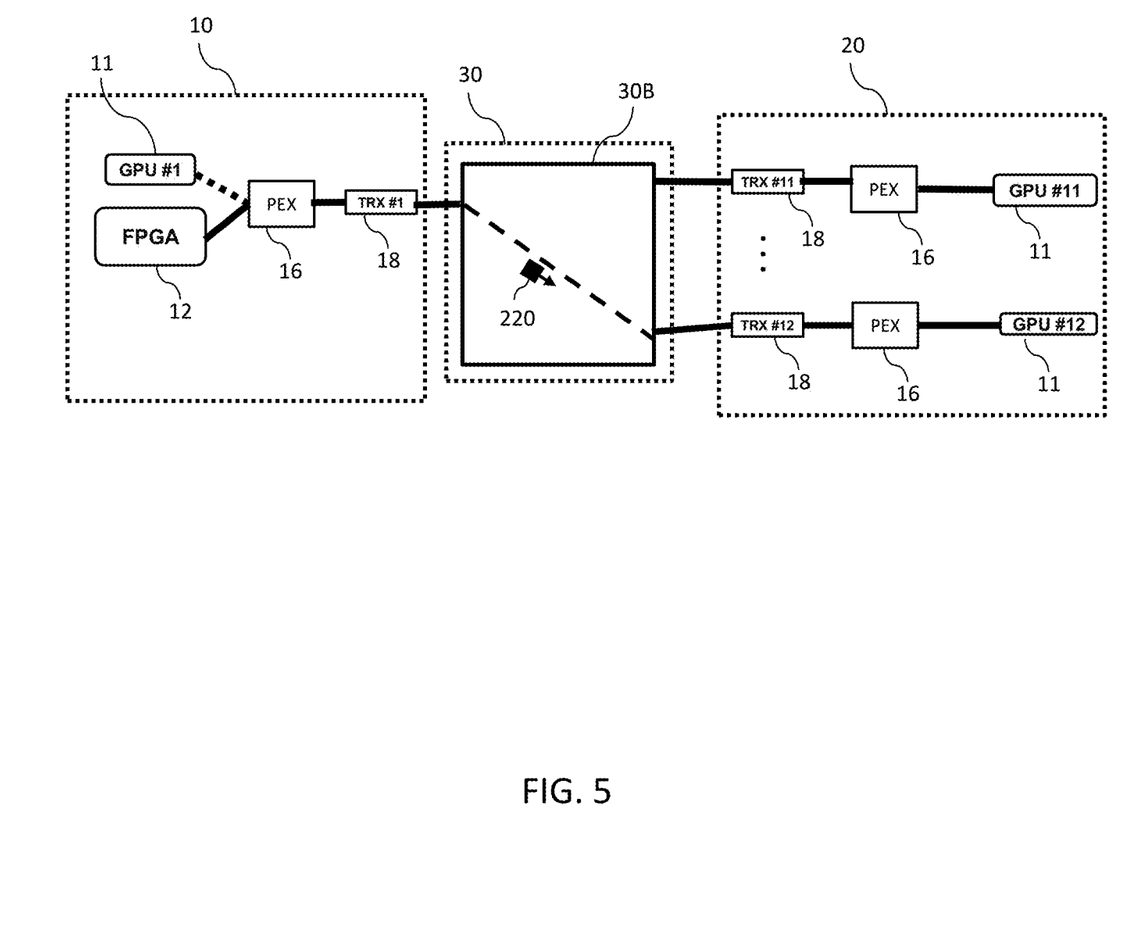
FIG. 5 is a block-diagram of the computing unit of FIG. 3 communicating in a second configuration with the peer computing unit in accordance with yet another implementation of the present technology.

At a second in time and with respect to FIG. 5, after having selected an optical plane 30B to establish the connection between GPU #1 and GPU #12, the coordination module 12 of the computing unit 10 may transmit a pre-determined training sequence 220 to the second data processing device 11. More specifically, the pre-determined training sequence 220 is transmitted from the coordination module 12 of the computing unit 10, through the PEX 16 of the computing unit 10 and the interface device 18 corresponding to GPU #1, to the optical plane 30B.

It should be noted that the interface device 18 may be operating point-to-point. More specifically, once an interface device 18 connects one data processing device 11 to another data processing device 11 through the optical plane 30, the interface device 18 can neither be used for another connection nor for transmitting a training sequence. In this implementation and as best shown on FIG. 2, each data processing device 11 may use two interface devices 18 through PEX 16. In practice, when a first data processing device 11 uses a first interface device 18 to connect to second data processing device 11 over the optical plane 30, a second interface device 18 may be used for both of training a third processing device 11 and afterward for communication between the first and third data processing devices 11 over the optical plane 30.

The pre-determined training sequence 220 is further received by the interface device 18 corresponding to GPU #12, and transmitted thereto through the PEX 16 corresponding to GPU 311. The orchestrating module 100 may cause the coordination modules 12 of the computing units 10, 20 to establishment of a plurality of connections between different data processing devices 11 of the computing unit 10, 20 in parallel.

In a non-limiting example, the pre-determined training sequence 220 is a periodic sequence of bits such as 01010101, 110011001100 or 111001110011100. In use, the interface device 18 of the second data processing device 11 uses the pre-determined training sequence 220 to recover a signal clock. Summarily, GPU #1 may communicate with GPU #11 while, concurrently, the interface device 18 of GPU #12 is recovering a signal clock from coordination module 12 of the computing unit 10.

In an alternative implementation, the pre-determined training sequence 220 is generated by the CPU 17 of the computing unit 10.

The pre-determined training sequence 220 is transmitted during a pre-determined period of time T. For example, the pre-determined period of time T may be between 100 and 300 nanoseconds. In other words, the interface device 18 of GPU #12 may attempt to recover a signal clock during the pre-determined period of time T. In an implementation, the pre-determined period of time T depends on a bit rate of the transmission over the optical network 30.

Figure 6:
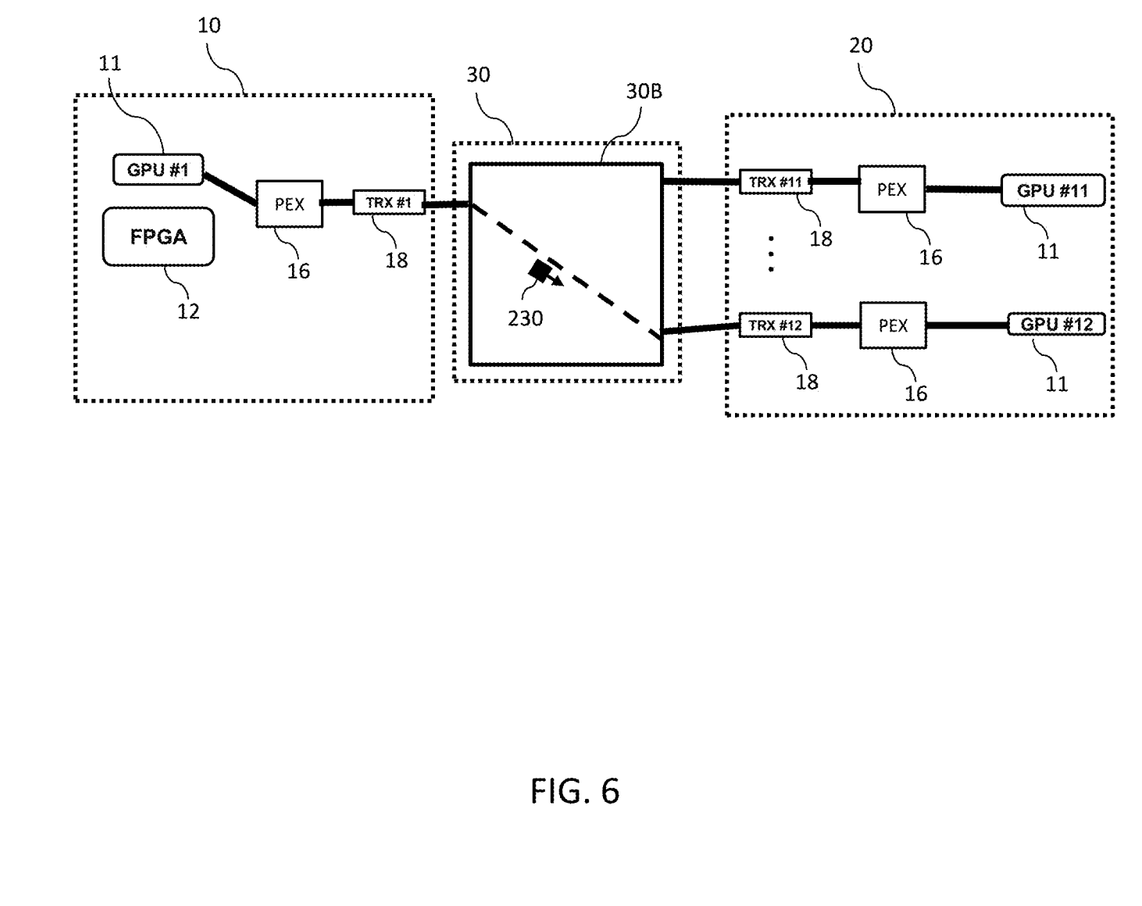
FIG. 6 is a block-diagram of the computing unit of FIG. 3 communicating in a third configuration with the peer computing unit in accordance with yet another implementation of the present technology.

Once the pre-determined training sequence 220 has elapsed, the interface device 18 of GPU #12 is expected to have recovered the signal clock and GPU #1 may start transmitting data to GPU #12 over the optical plane 30B using the interface device 18 denoted "TRX #1" at a third moment in time as shown on FIG. 6. In other words, the interface device 18 of GPU #12 performs the clock and data recovery (CDR) before GPU #1 starts transmitting the data. For example, a data packet 230 may be transmitted from GPU #1 to GPU #12 over the optical plane 30B using another interface device 18 distinct from TRX #1. Given that the interface device 18 of GPU #12 has recovered the signal clock, the data packet 230 may be properly sampled at the computing unit 20. The data packet 230 is transmitted on a same communication path than the communication path that was used to transmit the pre-determined training sequence 220. It may be noted that the present technology is rate-agnostic given that the described approach does not affect the communication path.

In an implementation, the data packet 230 is prepared by GPU #1 in parallel to the pre-determined training sequence 220 being transmitted from the coordination module 12 of the computing unit 10 to GPU #12.

In an implementation, the pre-determined training sequence 220 and the data packet 230 are consecutively transmitted to the interface device 18 of GPU #12 via the PEX 16 of the computing unit 10 assuming a PCI express (PCIe) delay is below a pre-determined threshold. For example, a PCI throughput of 16 GB/sec may imply that a full 1500 Bytes packet will have a 100 nsec time.

The present technology may be used on existing computing units, such that there is no change to the design of the computing units, as functions described in the present disclosure are provided through the coordination modules 12 that may be inserted in a PCI slot of a computing unit. Moreover, the present technology allows achieving low-cost interconnectivity of data processing devices (e.g. GPUs) using off-the-shelf 200 G/400 G/800 G transceivers through optical networks.

Figure 7:
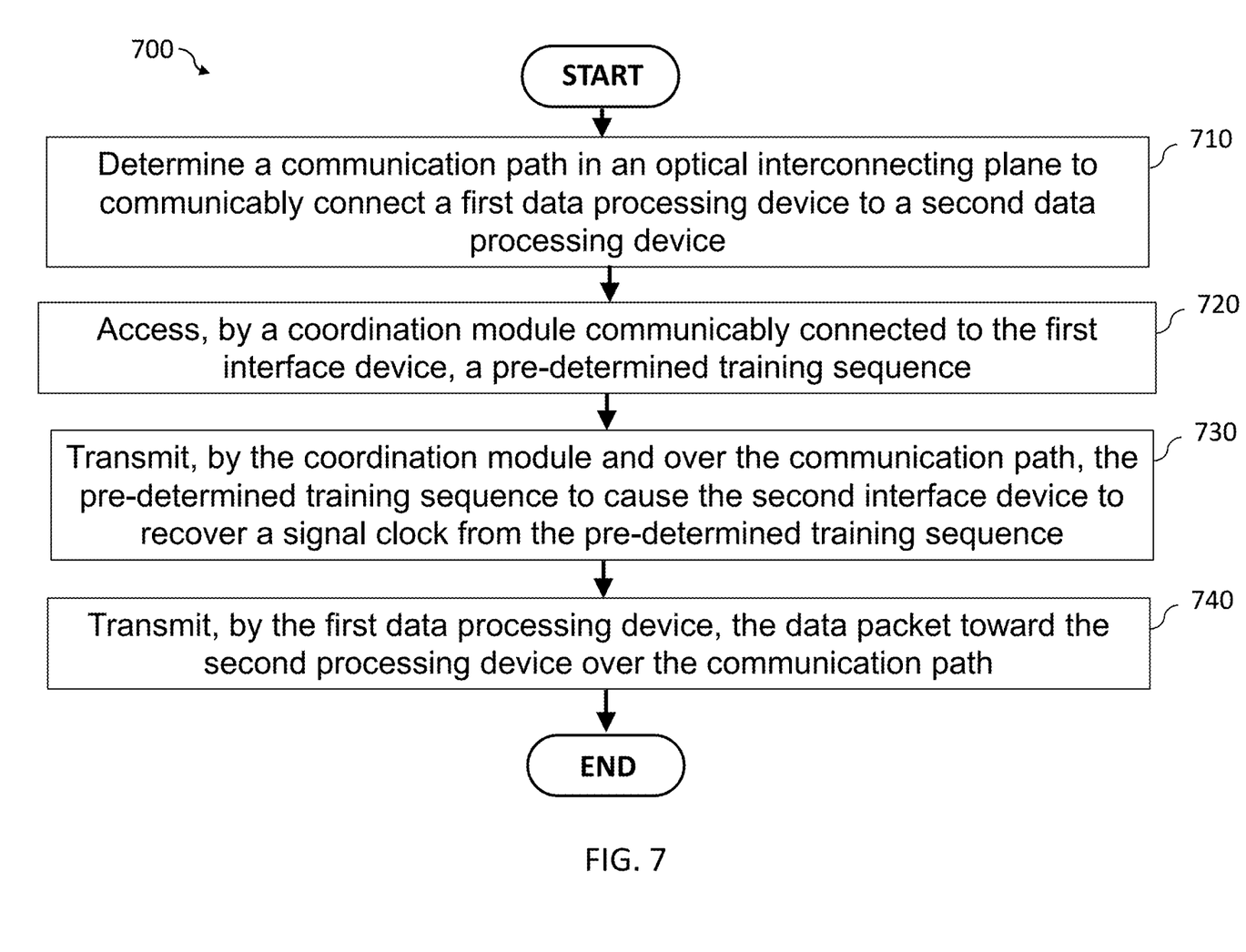
FIG. 7 illustrates a flow diagram showing operations of a method for transmitting a data packet from a first data processing device toward a second data processing device in accordance with non-limiting examples of the present technology.

FIG. 7 is a flow diagram of a method 700 for transmitting a data packet from a first data processing device toward a second data processing device according to some implementations of the present technology. In one or more aspects, the method 700 or one or more steps thereof may be performed by a processor or a computer system, such as the orchestrating module 100. The first and second data processing devices are communicably connectable to one another via respective first and second interface devices, such as the corresponding interface devices 18, and over an optical network, such as the optical network 30. The method 700 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

The method 700 starts with determining, at operation 710, a communication path in the optical network to communicably connect the first data processing device to the second data processing device. In an implementation, the first data processing device is a first graphic processing unit (GPU). In the same or another implementation, the second data processing device is a second GPU. In the same or another implementation, the first data processing device is a first GPU of a first server, and the second data processing device is a second GPU of a second server.

In an implementation, the method further includes, concurrently with transmitting the pre-determined training sequence, transmitting, from the first data processing device to a third processing device, a second data packet over a second communication path, via a third interface device associated with the first processing device and a fourth interface device associated with the third processing device. In other words, the first data processing device may communicate with the third data processing device in parallel to the interface device of the second data processing device recovering a signal clock from the first data processing device based on the pre-determined training sequence.

The method 700 continues with accessing, at operation 720, a pre-determined training sequence by a coordination module communicably connected to the first interface device. In an implementation, the training sequence comprises a periodic sequence of bits. More specifically, the orchestrating module 100 may cause the coordination module to access or generate the pre-determined training sequence. The pre-determined training sequence may be stored in a memory communicably connected to the coordination module.

In an implementation, the pre-determined training sequence may be stored in a coordination module, being implemented, for example, in a field-programmable gate array (FPGA), communicably connected to the first data processing device. In another implementation, the coordination module may be implemented in a central processing unit (CPU) communicably connected to the first data processing device.

The method 700 continues with transmitting, at operation 730, the pre-determined training sequence to cause the second interface device to recover a signal clock from the pre-determined training sequence by the coordination module and over the communication path. More specifically, the orchestrating module 100 may cause the coordination module to transmit the pre-determined training sequence to the second interface device over the communication path.

In an implementation, the data packet is transmitted once a pre-determined time delay has elapsed after transmitting the pre-determined training sequence. For example, the pre-determined time delay may be between 50 and 150 nanoseconds.

The method 700 ends with transmitting, at operation 740, the data packet toward the second processing device over the communication path by the first data processing device. More specifically, the orchestrating module 100 may cause the first data processing device to transmit the data packet to the second processing device.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

Figure 8:
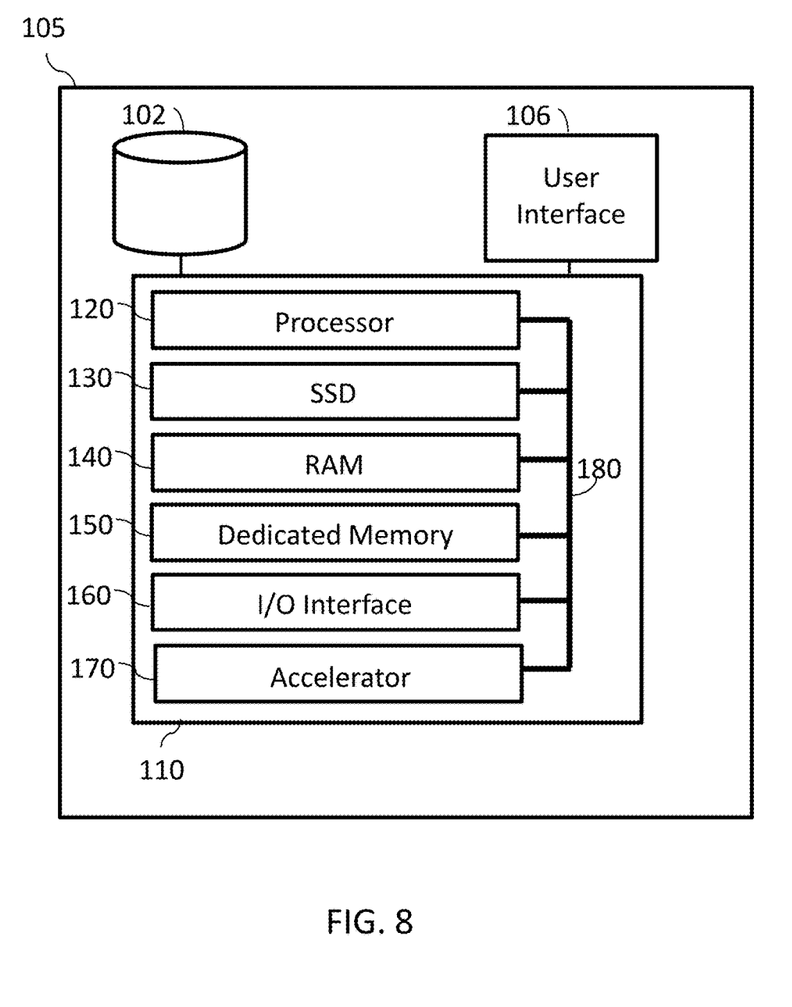
FIG. 8 is a block diagram of an electronic device in accordance with an example of the present technology.

With reference to FIG. 8, is a schematic representation of an electronic device 105 in accordance with an implementation of the present technology. The orchestrating module 100 may be implemented as the electronic device 105. In the illustrated, non-limiting example, the electronic device 105 includes a processing unit 110. In some implementations, the processing unit 110 may be implemented by any of a conventional personal computer, a controller, and/or an electronic device (e.g., a server, a controller unit, a control device, a monitoring device etc.) and/or any combination thereof appropriate to the relevant task at hand. In some implementations, the processing unit 110 comprises various hardware components including one or more single or multi-core processors collectively represented by a processor 120, a solid-state drive 130, a RAM 140, a dedicated memory 150 and an input/output interface 160. The processing unit 110 may be a generic computer system.

In some other implementations, the processing unit 110 may be an "off the shelf" generic computer system. In some implementations, the processing unit 110 may also be distributed amongst multiple systems. The processing unit 110 may also be specifically dedicated to the implementation of the present technology. As a person skilled in the art of the present technology may appreciate, multiple variations as to how the processing unit 110 is implemented may be envisioned without departing from the scope of the present technology.

Communication between the various components of the processing unit 110 may be enabled by one or more internal and/or external buses 180 (e.g. a PCI bus, universal serial bus, IEEE 1394 "Firewire" bus, SCSI bus, Serial-ATA bus, ARINC bus, etc.), to which the various hardware components are electronically coupled.

The input/output interface 160 may provide networking capabilities such as wired or wireless access. As an example, the input/output interface 160 may comprise a networking interface such as, but not limited to, one or more network ports, one or more network sockets, one or more network interface controllers and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 130 stores program instructions suitable for being loaded into the RAM 140 and executed by the processor 120. Although illustrated as a solid-state drive 130, any type of memory may be used in place of the solid-state drive 130, such as a hard disk, optical disk, and/or removable storage media.

The processor 120 may be a general-purpose processor, such as a central processing unit (CPU) or a processor dedicated to a specific purpose, such as a digital signal processor (DSP). In some implementations, the processor 120 may also rely on an accelerator 170 dedicated to certain given tasks. In some implementations, the processor 120 or the accelerator 170 may be implemented as one or more field programmable gate arrays (FPGAs). Moreover, explicit use of the term "processor", should not be construed to refer exclusively to hardware capable of executing software, and may implicitly include, without limitation, application specific integrated circuit (ASIC), read-only memory (ROM) for storing software, RAM, and non-volatile storage. Other hardware, conventional and/or custom, may also be included.

Further, the electronic device 105 includes a Human-Machine Interface (HMI) 106. The HMI 106 may include a screen or a display capable of rendering an interface including outputs of the executed MLA, predictions and human-interpretable outputs. In this implementation, the display of the HMI 106 includes and/or be housed with a touchscreen to permit users to input data via some combination of virtual keyboards, icons, menus, or other Graphical User Interfaces (GUIs). The HMI 106 may thus be referred to as a user interface 106. In some implementations, the display of the user interface 106 may be implemented using a Liquid Crystal Display (LCD) display or a Light Emitting Diode (LED) display, such as an Organic LED (OLED) display. The device may be, for example and without being limitative, a handheld computer, a personal digital assistant, a cellular phone, a network device, a smartphone, a navigation device, an e-mail device, a game console, or a combination of two or more of these data processing devices or other data processing devices. The user interface 106 may be embedded in the electronic device 105 as in the illustrated implementation of FIG. 8 or located in an external physical location accessible to the user. For example, the user may communicate with the processing unit 110 (i.e. send instructions thereto and receive information therefrom) by using the user interface 106 wirelessly connected to the processing unit 110. The processing unit 110 may be communicate with the user interface 106 via a network (not shown) such as a Local Area Network (LAN) and/or a wireless connexion such as a Wireless Local Area Network (WLAN).

The electronic device 105 may comprise a memory 102 communicably connected to the processing unit 110 for storing outputs of the MLAs for example, and/or history of execution of the MLA. The memory 102 may be embedded in the electronic device 105 as in the illustrated implementation of FIG. 1 or located in an external physical location. The processing unit 110 may be configured to access a content of the memory 102 via a network (not shown) such as a Local Area Network (LAN) and/or a wireless connection such as a Wireless Local Area Network (WLAN).

The electronic device 105 may also include a power system (not depicted) for powering the various components. The power system may include a power management system, one or more power sources (e.g., battery, alternating current (AC)), a recharging system, a power failure detection circuit, a power converter or inverter and any other components associated with the generation, management and distribution of power in mobile or non-mobile devices.

It should be noted that the processing unit 110 may be implemented as a conventional computer server or cloud-based (or on-demand) environment. Needless to say, the processing unit 110 may be implemented in any other suitable hardware, software, and/or firmware, or a combination thereof. In the depicted non-limiting implementations of the present technology in FIG. 8, the processing unit 110 is a single server. In alternative non-limiting implementations of the present technology, the functionality of the processing unit 110 may be distributed and may be implemented via multiple servers.

It should be expressly understood that not all technical effects mentioned herein need to be enjoyed in each and every implementation of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of transmitting a first data packet from a first data processing device toward a second data processing device, the first and second data processing devices being communicably connectable to one another via respective first and second interface devices, and over an optical network, the method comprising:
    determining a first communication path in the optical network to communicably connect the first data processing device to the second data processing device;
    accessing, by a coordination module communicably connected to the first interface device, a pre-determined training sequence;
    transmitting, by the coordination module and over the first communication path, the pre-determined training sequence to cause the second interface device to recover a signal clock from the pre-determined training sequence;
    concurrently with transmitting the pre-determined training sequence, by the coordination module and over the first communication path, transmitting, from the first data processing device to a third data processing device, a second data packet over a second communication path, via a third interface device associated with the first data processing device and a fourth interface device associated with the third data processing device; and
    after transmitting of the pre-determined training sequence, transmitting, by the first data processing device, the first data packet toward the second processing device over the first communication path.

2. The method of claim 1, wherein the training sequence comprises a periodic sequence of bits.

3. The method of claim 1, wherein the first data processing device is a first graphic processing unit (GPU).

4. The method of claim 1, wherein the second data processing device is a second GPU.

5. The method of claim 1, wherein the first data processing device is a first GPU of a first server, and the second data processing device is a second GPU of a second server.

6. The method of claim 1, wherein the coordination module is a field-programmable gate array (FPGA) communicably connected to the first data processing device.

7. The method of claim 1, wherein the coordination module is a central processing unit (CPU) communicably connected to the first data processing device.

8. The method of claim 1, further comprising:
    transmitting the first data packet once a pre-determined time delay has elapsed after transmitting the pre-determined training sequence.

9. The method of claim 8, wherein the pre-determined time delay is between 50 and 150 ns.

10. A computing unit, comprising:
    a first data processing device communicably connectable to a second data processing device of a peer computing unit via respective first and second interface devices and over an optical network;
    a coordination module configured to:
        receive, from an orchestrating module communicably connected to the coordination module, information about a first communication path and a second communication path of the optical network;
        cause the first interface device to connect the first data processing device to a first end of the communication path to communicably connect the first data processing device to the second data processing device, the second interface device being connected to a second end of the communication path;
        transmit a pre-determined training sequence to the second interface device over the communication path, a reception of the pre-determined training sequence by the second interface device causing the second interface device to perform a clock data recovery routine to recover a signal clock from the pre-determined training sequence; and
        cause the first data processing device to transmit a first data packet to the second data processing device over the first communication path,
    the orchestrating module being further configured to, concurrently with causing the transmission of the pre-determined training sequence over the first communication path, cause the first data processing device to transmit a second data packet over a second communication path to a third data processing device communicably connected thereto, via a third interface device associated with the first data processing device and a fourth interface device associated with the third data processing device.

11. The computing unit of claim 10, wherein the training sequence comprises a periodic sequence of bits.

12. The computing unit of claim 10, wherein the first data processing device is a first GPU.

13. The computing unit of claim 10, wherein the second data processing device is a second GPU.

14. The computing unit of claim 10, wherein the first data processing device is a first GPU of a first server, and the second data processing device is a second GPU of a second server.

15. The computing unit of claim 10, wherein the coordination module is a FPGA communicably connected to the first data processing device.

16. The computing unit of claim 10 wherein the coordination module is a CPU communicably connected to the first data processing device.

17. The computing unit of claim 10, wherein the orchestrating module is further configured to:
   cause the first data processing device to transmit the first data packet once a pre-determined time delay has elapsed after the transmission of the pre-determined training sequence from the coordination module to the second data processing device is over.

18. The data processing assembly of claim 17, wherein the pre-determined time delay is between 50 and 150 ns.

\* \* \* \* \*